United States Patent
Stachurski et al.

(10) Patent No.: US 9,245,529 B2
(45) Date of Patent: Jan. 26, 2016

(54) ADAPTIVE ENCODING OF A DIGITAL SIGNAL WITH ONE OR MORE MISSING VALUES

(75) Inventors: Jacek Piotr Stachurski, Dallas, TX (US); Lorin Paul Netsch, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 735 days.

(21) Appl. No.: 12/818,166

(22) Filed: Jun. 18, 2010

(65) Prior Publication Data

US 2010/0324914 A1  Dec. 23, 2010

Related U.S. Application Data

(60) Provisional application No. 61/218,307, filed on Jun. 18, 2009, provisional application No. 61/219,198, filed on Jun. 22, 2009, provisional application No. 61/219,868, filed on Jun. 24, 2009.

(51) Int. Cl.
*G10L 19/00* (2013.01)

(52) U.S. Cl.
CPC .................... *G10L 19/0017* (2013.01)

(58) Field of Classification Search
CPC ..... G10L 19/008; G10L 19/24; G10L 19/167; G10L 21/038; G11B 20/10527
USPC .......................................... 704/500, 200–299
See application file for complete search history.

(56) References Cited

U.S. PATENT DOCUMENTS

| | | | | |
|---|---|---|---|---|
| 4,092,493 A | * | 5/1978 | Rabiner et al. | 704/237 |
| RE32,580 E | * | 1/1988 | Atal et al. | 704/219 |
| 4,819,088 A | * | 4/1989 | Higurashi | 386/338 |
| 4,965,668 A | * | 10/1990 | Abt et al. | 348/574 |
| 4,991,215 A | * | 2/1991 | Taguchi | 704/216 |
| 5,148,487 A | * | 9/1992 | Nagai et al. | 704/265 |
| 5,394,473 A | * | 2/1995 | Davidson | 704/200.1 |
| 5,469,474 A | * | 11/1995 | Kitabatake | 375/243 |
| 5,581,653 A | * | 12/1996 | Todd | 704/229 |
| 5,634,082 A | * | 5/1997 | Shimoyoshi et al. | 704/200.1 |
| 5,742,773 A | * | 4/1998 | Blomfield-Brown et al. | 709/228 |
| 5,812,601 A | * | 9/1998 | Schramm | 375/262 |
| 6,272,123 B1 | * | 8/2001 | Abe | 370/342 |
| 6,424,936 B1 | * | 7/2002 | Shen et al. | 704/200.1 |
| 6,484,285 B1 | * | 11/2002 | Dent | 714/791 |
| 6,542,865 B1 | * | 4/2003 | Nagao et al. | 704/229 |
| 6,778,966 B2 | * | 8/2004 | Bizjak | 704/500 |
| 6,784,812 B2 | * | 8/2004 | Craven et al. | 341/50 |
| 7,003,704 B2 | * | 2/2006 | Adams et al. | 714/711 |

(Continued)

OTHER PUBLICATIONS

Jacek Stachurski, Lorin Netsch: Fractional-bit and value-location lossless encoding in G.711.0 coder. ICASSP 2010: 4666-4669.*

(Continued)

*Primary Examiner* — Pierre-Louis Desir
*Assistant Examiner* — Fariba Sirjani
(74) *Attorney, Agent, or Firm* — Gregory J. Albin; Frank D. Cimino

(57) ABSTRACT

A method of encoding samples in a digital signal is provided that includes receiving a plurality of samples of the digital signal, and encoding the plurality of samples, wherein an output number of bits is adapted for coding efficiency when a value in a range of possible distinct data values of the plurality of samples is not found in the plurality of samples.

6 Claims, 3 Drawing Sheets

(56) References Cited

U.S. PATENT DOCUMENTS

| | | | |
|---|---|---|---|
| 7,107,153 B2* | 9/2006 | Kisra et al. | 702/6 |
| 7,154,943 B2* | 12/2006 | Simeoni | 375/224 |
| 7,249,153 B2* | 7/2007 | Cheng et al. | 708/203 |
| 7,310,596 B2* | 12/2007 | Ota et al. | 704/201 |
| 7,446,771 B2* | 11/2008 | Kim et al. | 345/473 |
| 7,471,839 B2* | 12/2008 | Moreira | 382/240 |
| 7,515,762 B2* | 4/2009 | Suzuki et al. | 382/246 |
| 7,571,094 B2* | 8/2009 | Goudar | 704/221 |
| 7,580,832 B2* | 8/2009 | Allamanche et al. | 704/205 |
| 7,599,835 B2* | 10/2009 | Moriya et al. | 704/226 |
| 7,831,434 B2* | 11/2010 | Mehrotra et al. | 704/500 |
| 7,885,819 B2* | 2/2011 | Koishida et al. | 704/500 |
| 7,917,362 B2* | 3/2011 | Shieh | 704/248 |
| 7,933,417 B2* | 4/2011 | Toyama et al. | 381/23 |
| 7,991,622 B2* | 8/2011 | Malvar | 704/504 |
| 8,032,388 B1* | 10/2011 | Luh et al. | 704/503 |
| 8,069,051 B2* | 11/2011 | Lindahl et al. | 704/503 |
| 8,078,457 B2* | 12/2011 | Ghenania et al. | 704/219 |
| 8,290,782 B2* | 10/2012 | Shmunk | 704/500 |
| 8,521,540 B2* | 8/2013 | Burns et al. | 704/500 |
| 8,542,727 B2* | 9/2013 | Jahanghir | 375/240 |
| 8,571,112 B2* | 10/2013 | Qi et al. | 375/240.25 |
| 2001/0053973 A1* | 12/2001 | Tsuzuki | 704/229 |
| 2003/0200097 A1* | 10/2003 | Brand | 704/500 |
| 2004/0083452 A1* | 4/2004 | Minor et al. | 717/109 |
| 2004/0153318 A1* | 8/2004 | Chamberlain | 704/222 |
| 2004/0153959 A1* | 8/2004 | Kim et al. | 714/799 |
| 2005/0063219 A1* | 3/2005 | Rolandi | 365/154 |
| 2005/0065787 A1* | 3/2005 | Stachurski | 704/229 |
| 2005/0159947 A1* | 7/2005 | Chen et al. | 704/230 |
| 2005/0222775 A1* | 10/2005 | Kisra et al. | 702/14 |
| 2005/0234716 A1* | 10/2005 | Vernon et al. | 704/229 |
| 2005/0256722 A1* | 11/2005 | Clark | 704/500 |
| 2006/0008165 A1* | 1/2006 | Budge et al. | 382/240 |
| 2006/0053020 A1* | 3/2006 | Chen et al. | 704/503 |
| 2006/0114977 A1* | 6/2006 | Ginis et al. | 375/222 |
| 2006/0115092 A1* | 6/2006 | Toyama et al. | 381/23 |
| 2006/0143018 A1* | 6/2006 | Densham et al. | 704/500 |
| 2006/0153286 A1* | 7/2006 | Andersen et al. | 375/229 |
| 2006/0206314 A1* | 9/2006 | Plummer | 704/200.1 |
| 2006/0239576 A1* | 10/2006 | Mukherjee | 382/248 |
| 2007/0011000 A1* | 1/2007 | Liebchen | 704/219 |
| 2007/0027656 A1* | 2/2007 | Baraniuk et al. | 702/189 |
| 2008/0008246 A1* | 1/2008 | Mukherjee et al. | 375/240.18 |
| 2008/0065393 A1* | 3/2008 | Kincaid | 704/500 |
| 2008/0095453 A1* | 4/2008 | Suzuki et al. | 382/246 |
| 2008/0129560 A1* | 6/2008 | Baraniuk et al. | 341/87 |
| 2008/0144701 A1* | 6/2008 | Gold | 375/132 |
| 2008/0215317 A1* | 9/2008 | Fejzo | 704/217 |
| 2008/0226183 A1* | 9/2008 | Lei et al. | 382/238 |
| 2008/0228500 A1* | 9/2008 | Oh et al. | 704/500 |
| 2008/0240108 A1* | 10/2008 | Hyldgaard | 370/394 |
| 2008/0262850 A1* | 10/2008 | Taleb et al. | 704/500 |
| 2009/0070104 A1* | 3/2009 | Jones et al. | 704/211 |
| 2009/0070587 A1* | 3/2009 | Srinivasan et al. | 713/176 |
| 2009/0190755 A1* | 7/2009 | Sewell et al. | 380/46 |
| 2009/0281798 A1* | 11/2009 | Den Brinker et al. | 704/219 |
| 2009/0319261 A1* | 12/2009 | Gupta et al. | 704/207 |
| 2010/0075606 A1* | 3/2010 | Hargreaves | 455/41.3 |
| 2010/0082337 A1* | 4/2010 | Sato et al. | 704/219 |
| 2010/0166055 A1* | 7/2010 | Schmit et al. | 375/240.01 |
| 2010/0272185 A1* | 10/2010 | Gao et al. | 375/240.18 |
| 2010/0286990 A1* | 11/2010 | Biswas et al. | 704/500 |
| 2010/0286991 A1* | 11/2010 | Hedelin et al. | 704/500 |
| 2010/0324913 A1* | 12/2010 | Stachurski et al. | 704/500 |
| 2010/0324914 A1* | 12/2010 | Stachurski et al. | 704/500 |
| 2010/0332238 A1* | 12/2010 | Netsch et al. | 704/500 |
| 2011/0026591 A1* | 2/2011 | Bauza et al. | 375/240.12 |
| 2011/0035212 A1* | 2/2011 | Briand et al. | 704/203 |
| 2011/0188617 A1* | 8/2011 | Eklund et al. | 375/346 |
| 2011/0257982 A1* | 10/2011 | Smithers | 704/500 |
| 2012/0087504 A1* | 4/2012 | Thumpudi et al. | 381/23 |
| 2012/0215546 A1* | 8/2012 | Biswas et al. | 704/500 |
| 2012/0232911 A1* | 9/2012 | Wu et al. | 704/500 |

OTHER PUBLICATIONS

"Lossless Compression of G.711 Pulse Code Modulation", ITU-T Telecommunication Standardization Sector of ITU, Series G: Transmission Systems and Media, Digital Systems and Networks, Digital terminal equipments—Coding of voice and audio signals, Recommendation ITU-T G.711.0, Sep. 2009, pp. 1-72.

Solomon W. Golomb, "Run-Length Encodings", IEEE Transactions on Information Theory, Jul. 1966, vol. 12, Issue 3, pp. 399-401.

Robert F. Rice, "Some Practical Universal Noiseless Coding Techniques", JPL Publication 79-22, Mar. 15, 1979, National Aeronautics and Space Administration, Pasadena, CA, pp. 1-130.

Jacek P. Stachurski, et al., "Method and System for Block Adaptive Fractional-Bit Per Sample Coding", U.S. Appl. No. 12/818,164, filed Jun. 18, 2010, pp. 1-24.

Lorin P. Netsch and Jacek P. Stachurski, "Method and System for Lossless Value-Location Encoding", U.S. Appl. No. 12/818,165, filed Jun. 18, 2010, pp. 1-31.

* cited by examiner

ADAPTIVE ENCODING OF A DIGITAL SIGNAL WITH ONE OR MORE MISSING VALUES

CROSS-REFERENCE TO RELATED APPLICATIONS

This application claims benefit of U.S. Provisional Patent Application Ser. No. 61/218,307, filed Jun. 18, 2009, U.S. Provisional Patent Application Ser. No. 61/219,198, filed Jun. 22, 2009, and U.S. Provisional Patent Application Ser. No. 61/219,868, filed Jun. 24, 2009, which are incorporated herein by reference in their entirety.

BACKGROUND OF THE INVENTION

In many signal processing applications, it is desirable to transmit and/or store a digitized signal such that the exact original signal may be recovered. It is also desirable to reduce the number of bits needed to represent the signal in order to maximize the amount of data that can be handled during the transmission and/or storage process. Lossless compression techniques may be used to achieve this goal. Many techniques exist for lossless compression including Huffman coding, run-length coding, and predictive coding. Each of these coding techniques may provide comparatively better compression for certain classes of signals. However, improvements in lossless compression of digital signals are desirable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
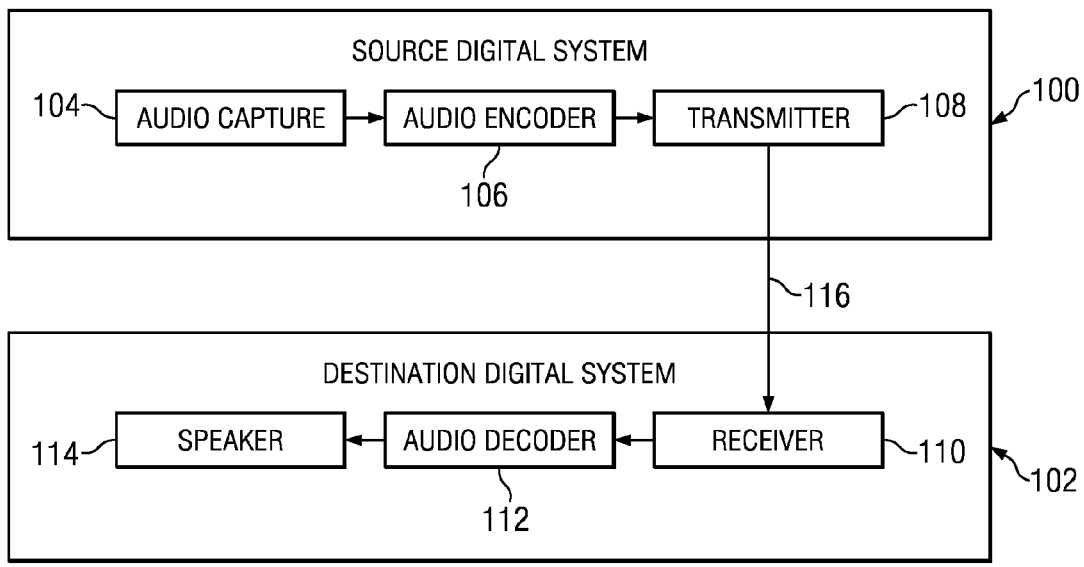
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, while some embodiments of the invention are described herein in reference to the ITU-T G.711.0 standard and/or audio signals, one of ordinary skill in the art will understand that embodiments of the invention are not limited to any particular signal coding standard or type of signal. Recommendation ITU-T G.711.0 ("ITU-T G.711.0") as approved on Sep. 22, 2009 by ITU-T Study Group 16, which describes the audio encoder in detail, is incorporated by reference herein in its entirety.

In general, embodiments of the invention provide for encoding of a digital signal in which an output number of bits is adapted for coding efficiency when a value in a range of possible distinct data values in a segment of N samples, i.e., a frame, of the digital signal is not found in the segment. The range of possible distinct data values is defined to be the values between and including a maximum sample value and a minimum sample value in the segment. In some embodiments of the invention, the output number of bits is adapted by reducing a computed possible data value range for the segment, i.e., an integer representative of the number of possible distinct data values in the segment, by one for each value in the range of possible distinct data values that is not found in the segment. The resulting actual data value range is then used in encoding the segment and may provide better coding efficiency than the possible data value range. In some embodiments of the invention, the output number of bits is adapted by reducing the computed possible data value range for the segment by one when a predetermined value is not found in the segment. The resulting reduced data value range is then used in encoding the segment and may provide better coding efficiency than the possible data value range. In some embodiments of the invention, the output number of bits is adapted by encoding an indicator that a value in the range of possible distinct data values was not found in the segment.

Some signal coding techniques, e.g., fractional-bit encoding, compute the data value range of a frame of N samples and encode the frame using the computed range as a multiplier. The data value range L is an integer representative of the number of possible distinct data values in the N samples and may be computed as the difference between the maximum and minimum values of the N samples s(n) in the frame, i.e., $L = v_{max} - v_{min} + 1$ where $v_{max} = \max\{s(n)|n=0, \ldots, N-1\}$ and where $v_{min} = \min\{s(n)|n=0, \ldots, N-1\}$. For example, if the distinct data values in the frame are $\{-3, -2, 0, 1, 2\}$, then $L=6$, indicating that there are six possible distinct data values in the frame. Note, however, that there are only five actual distinct data values in the example frame, i.e., one value in the range, $-1$, does not actually occur in the frame. The same data value range is also computed if the distinct data values in the frame are $\{-3, -2, -1, 0, 1, 2\}$. Further, the same data value range is also computed if the distinct data values are {−3, 0, 1, 2}. As is explained in more detail below, the size of the computed data value range L may directly affect the number of bits needed to encode a sample. Accordingly, if the data value range L is reduced to reflect the actual number of distinct data values in the frame, rather than the possible number of distinct data values, the number of bits needed to encode each sample, and the frame, may be reduced.

Assuming binary encoding is used, a frame with distinct data values between a minimum $v_{min}$ and a maximum $v_{max}$ may need $b = \lceil \log_2(L) \rceil$ bits to represent an encoded sample value. Further, the maximum data value range L that can be represented by b bits is $L_b = 2^b$. For example, assuming an 8-bit per sample data representation, the possible minimum and maximum data values in a frame, $v_{min}$ and $v_{max}$, may be −128 and 127, respectively, and the maximum data value range $L_8$ for a frame would be 256. For some signals, some of the frames may only contain samples with values within a smaller data value range, for example $L_3 = 8$. If information about the data value range L and minimum data value $v_{min}$ within a frame is provided to the decoder, the average number of encoding bits per sample may be reduced. For example, consider a frame with 160 samples initially represented with an 8-bit per sample data representation in which the sample values are limited to the data value range $L_3 = 8$ and the minimum sample value $v_{min} = -3$. Without the range limitation, the frame may be encoded with B=160*8=1280 bits. If the data value range is limited, the range-limited frame may be encoded with B=160*3=480 bits plus a few bits to communicate L and $v_{min}$. For this example, 11 bits would be sufficient to encode L and $v_{min}$, 3 bits to encode the data value range L (a choice of $L_1$ to $L_8$), and 8 bits to encode the minimum $v_{min}$ (one of 256 possible values).

One or more embodiments of the invention provide a further bit-reduction technique in which the data value range in some frames of a digital signal may be reduced so that the average number of encoding bits per sample, and thus, the overall number of encoding bits per frame, may be reduced.

Further, some signal coding techniques, e.g., value-location encoding, encode a frame of N samples by encoding the vectors identifying the locations in the frame of each value in the range of possible distinct data values of the frame. For some frames, one or more of the values in the range of possible distinct data values may not be found in the frame, i.e., are missing from the frame, so in the vectors corresponding to the missing one or more values, there are no locations to encode. One or more embodiments of the invention provide for encoding an indicator that a value is not found in the frame, rather than encoding the vector corresponding to the missing value.

FIG. 1 shows a block diagram of a digital system in accordance with one or more embodiments of the invention. The digital system is configured to perform coding of digital audio sequences using embodiments of the methods described herein. The system includes a source digital system (100) that transmits encoded digital audio sequences to a destination digital system (102) via a communication channel (116). The source digital system (100) includes an audio capture component (104), an audio encoder component (106) and a transmitter component (108). The audio capture component (104) is configured to provide an audio sequence to be encoded by the audio encoder component (106). The audio capture component (104) may be, for example, a microphone, a speech synthesizer, an audio archive, or an audio feed from an audio content provider.

The audio encoder component (106) receives an audio sequence from the audio capture component (104) and encodes it for transmission by the transmitter component (108). In general, the audio encoder component (106) receives the audio sequence from the audio capture component (104) as a sequence of frames and encodes the audio data in each frame for transmission. During the encoding process, a method for adaptive encoding of a digital signal with missing values in accordance with one or more of the embodiments described herein may be used. The functionality of an embodiment of the audio encoder component (106) is described in more detail below in reference to FIG. 4.

The transmitter component (108) transmits the encoded audio data to the destination digital system (102) via the communication channel (116). The communication channel (116) may be any communication medium, or combination of communication media suitable for transmission of the encoded audio sequence, such as, for example, wired or wireless communication media, a local area network, and/or a wide area network.

The destination digital system (102) includes a receiver component (110), an audio decoder component (112) and a speaker component (114). The receiver component (110) receives the encoded audio data from the source digital system (100) via the communication channel (116) and provides the encoded audio data to the audio decoder component (112) for decoding. In general, the audio decoder component (112) reverses the encoding process performed by the audio encoder component (106) to reconstruct the frames of the audio sequence. The reconstructed audio sequence may then be reproduced by the speaker component (114). The speaker component (114) may be any suitable audio reproduction device.

In some embodiments of the invention, the source digital system (100) may also include a receiver component and an audio decoder component and/or the destination digital system (102) may include a transmitter component and an audio encoder component for transmission of audio sequences in both directions. Further, the audio encoder component (106) and the audio decoder component (112) may perform encoding and decoding in accordance with one or more audio compression standards such as, for example, ITU-T G.711 and G.711.0 standards. The audio encoder component (106) and the audio decoder component (112) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Software implementing all or part of the audio encoder and/or audio decoder may be stored in a memory, e.g., internal and/or external ROM and/or RAM, and executed by a suitable instruction execution system, e.g., a microprocessor or DSP. Analog-to-digital converters and digital-to-analog converters may provide coupling to the real world, modulators and demodulators (plus antennas for air interfaces) may provide coupling for transmission waveforms, and packetizers may be included to provide formats for transmission.

Figure 2:
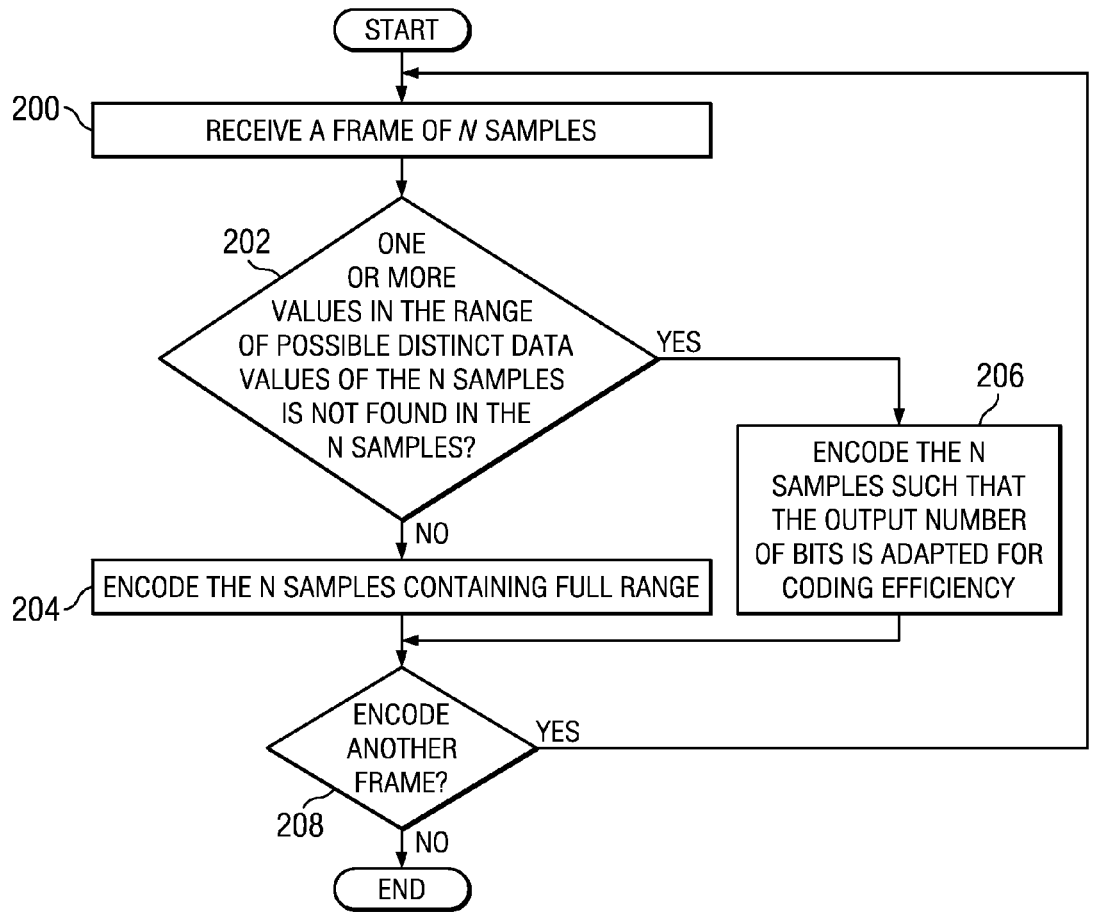
FIGS. 2 and 3 show flow diagrams of methods in accordance with one or more embodiments of the invention.

FIG. 2 shows a flow diagram of a method for adaptive encoding of a digital signal with missing values in one or more frames of samples in the digital signal in accordance with one or more embodiments of the invention. Initially, a frame of N samples of the digital signal is received (200). A determination is made as to whether one or more values in the range of possible distinct data values of the N samples are not found in the N samples (202). If all the possible distinct data values are in the N samples, the N samples are encoded (204). Otherwise, the N samples are encoded such that the output number of bits is adapted for coding efficiency (206). The steps 200-206 are repeated (208) for another frame in the digital signal that may have one or more missing values.

The value of N may be any suitable value. For example, N may be 40, 80, 160, 240, or 320. Further, any suitable encoding technique may be used to encode the N samples. The particular adaptation of the output number of bits when a value is missing may vary depending on the encoding technique. For example, in an encoding technique that uses the data value range L, i.e., the number of possible distinct data values in the frame, as a multiplier in encoding the N samples, the adaptation may be a form of data value range reduction as described below. One such encoding technique is block adaptive fractional-bit encoding as described in U.S. patent application Ser. No. 12/818,164, entitled "Method and System for Block Adaptive Fractional-Bit per Sample Encoding," filed on Jun. 18, 2010, which is incorporated by reference herein in its entirety. In another example, in an encoding technique that encodes the N samples by encoding vectors identifying the locations in the N samples of each value in the range of possible distinct data values of the N samples, the adaptation may be to encode an indicator that a value was not found in the N samples rather than encoding the vector corresponding to the missing value. This indicator may be encoded in any suitable way, such as, for example, a unique bit sequence. One such encoding technique is value-location coding as described in co-pending U.S. patent application Ser. No. 12/818,165, entitled "Method and System for Lossless Value-Location Encoding," filed on Jun. 18, 2010, which is incorporated by reference herein in its entirety.

Figure 3:
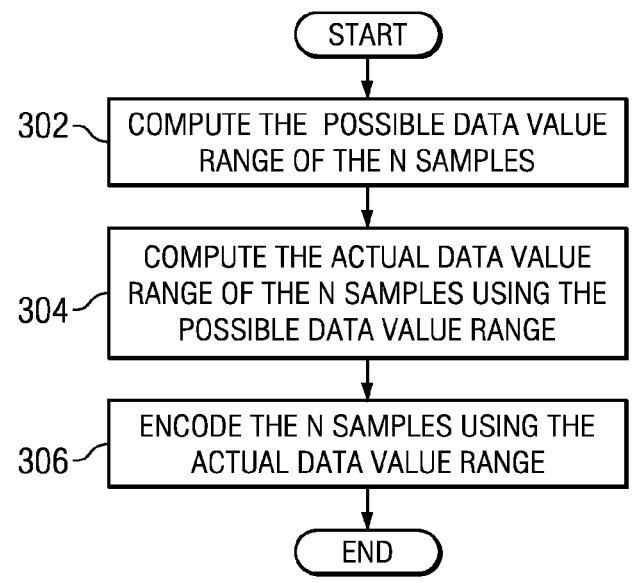

FIG. 3 shows a flow diagram of a method for data value range reduction in accordance with one or more embodiments of the invention that may be used to adapt the output number of bits in the method of FIG. 2. Initially, the data value range L for the frame is computed (302) to reflect the number of possible distinct data values in the frame. More specifically, in this initial computation, the data value range L, i.e., the possible data value range, is an integer representative of the number of possible distinct data values $v_k$ in the frame. The possible data value range L may be determined based on the difference between the maximum and minimum values of the N samples s(n) in the frame, e.g., $L=v_{max}-v_{min}+1$ where $v_{max}=\max\{s(n)|n=0, \ldots, N-1\}$ and where $v_{min}=\min\{s(n)|n=0, \ldots, N-1\}$. For example, if the distinct sample values in the frame are $\{-3, -2, 0, 1, 2\}$, then L=6, indicating that there are six possible sample values in the frame.

A computation is then performed to potentially reduce the possible data value range L to reflect the actual number of distinct sample values in the frame (304), i.e., to compute the actual data value range, L'. If s denotes the set of distinct data values that occur within a frame, then the actual data value range, L' is the size of the sets. Continuing the above example, if the distinct sample values in the frame are $\{-3, -2, 0, 1, 2\}$, then L' is equal to 5, indicating that there are five actual distinct data values in the frame. The actual data value range may be calculated as $$L' = L - \sum_{k=0}^{L-1} \delta_{v_k}$$

where $$\delta_{v_k} = \begin{cases} 1 & \text{if value } v_k \text{ does not exist in frame} \\ 0 & \text{otherwise} \end{cases}$$

and $v_k$, k=0 ... L-1 represents each of the L possible distinct data values in the frame.

The N samples in the frame are then encoded using the actual data value range (306). The encoding technique used may be any suitable encoding technique that relies upon the data value range in some way. For example, the encoding technique may be an embodiment of block adaptive fractional-bit encoding as described in U.S. patent application Ser. No. 12/818,164 (TI-67480). As part of the encoding, an indicator of the actual data value range and $v_{min}$ may be added to the output bit stream along with the encoded bits of the frame. Indicators for any values $v_k$ that did not exist in the frame, i.e., are missing from the frame, may also be added to the output bit stream. The actual data value range, $v_{min}$, and the indicators of missing values may be encoded using any suitable technique. For example, explicit encoding in the form of the bit representations of each may be used, or prefix codes (for examples, see Table 1 below) that implicitly indicate various combinations of the data value range, $v_{min}$, and/or the missing values $v_k$ may be used.

In one or more embodiments of the invention, data value range reduction is performed solely for those frames that include selected specific combinations of distinct data values, i.e., selected data value sets. The selected data value sets may be derived by analyzing the results of applying data value range reduction in an encoding technique, e.g., block adaptive fractional-bit encoding, to relevant test digital signals to determine the data value sets that could benefit from application of data value range reduction, i.e., that had more efficient encoding. The selected data value sets may then be used to determine if data value range reduction is to be performed for a frame. In such embodiments, the distinct data values in the frame may be compared to one or more of the selected data value sets that have the same data value range. If the distinct data values in the frame are the same as those in one of these data value sets, then data value range reduction may be used. Table 1 below shows selected data value sets for an embodiment of the invention included in ITU-T G.711.0.

TABLE 1

| | | | Prefix code for each frame length | | | | |
|---|---|---|---|---|---|---|---|
| L | L' | Data Value Sets | 40 | 80 | 160 | 240 | 320 |
| 2 | 2 | {0, 1} | 2 | 14 | 20 | 24 | 28 |
| 3 | 2 | {-2, 0} | 4 | 16 | 22 | 26 | 30 |
| 3 | 3 | {-2, -1, 0} | 6 | 18 | — | — | — |
| 3 | 3 | {-1, 0, 1} | 7 | 19 | — | — | — |
| 4 | 3 | {-2, 0, 1} | 5 | 17 | 23 | 27 | 31 |
| 4 | 4 | {-2, -1, 0, 1} | 3 | 15 | 21 | 25 | 29 |
| 5 | 4 | {-3, -2, 0, 1} | 8 | — | — | — | — |
| 5 | 4 | {-2, 0, 1, 2} | 10 | — | — | — | — |
| 5 | 5 | {-2, -1, 0, 1, 2} | 9 | — | — | — | — |
| 6 | 5 | {-3, -2, 0, 1, 2} | 12 | — | — | — | — |
| 6 | 6 | {-3, -2, -1, 0, 1, 2} | 11 | — | — | — | — |
| 7 | 6 | {-4, -3, -2, 0, 1, 2} | 13 | — | — | — | — |

Further, the computation of the actual data value range L' may be simplified for frames that include one of the selected data value sets. In some embodiments of the invention, a simplified computation may be performed when it is known that data value range reduction is beneficial when a specific predetermined value is not found in a frame. For example, for the data value sets in Table 1, data value range reduction may be beneficial when the value $v_k=-1$ does not exist in a frame. Accordingly, for frames that include one of the selected data value sets, the actual data value range L' may be calculated as $$L' = L - \delta_{-1}$$

where $$\delta_{-1} = \begin{cases} 1 & \text{if value } v_k = -1 \text{ does not exist within a frame} \\ 0 & \text{otherwise} \end{cases}.$$

For many frames, the possible number of distinct sample values and the actual number of distinct sample values may be the same. However, the actual number of distinct sample values may be smaller for a significant number of frames. For these latter frames, the reduction of L to L' may decrease the number of encoding bits per sample and the overall number of bits used to encode those frames. For example, consider a frame with N=160 samples, $v_{min}$=−2, and $v_{max}$=2 that is to be encoded using binary encoding. The possible data value range for such a frame is 5. If the set of distinct data values in the frame is {−2, −1,0,1,2}, then no data value range reduction is possible. Assuming binary encoding is used, each sample in this frame may be encoded with b=⌈$\log_2$(5)⌉=3 bits for a total of 480 bits for the frame (plus, assuming the samples in the frame are represented by 8 bits, 3 bits to encode the data value range and 8 bits to encode $v_{min}$).

However, if the set of distinct sample values in the frame is {−2, 0, 1, 2}, then L' is 4 and each sample may be encoded with b'=⌈$\log_2$(L')⌉=2 bits for a total of 320 bits for the frame (plus eleven bits to encode L' and $v_{min}$). Other possible sets of distinct data values that would yield the same bit rate reduction include {−2, −1, 1, 2} and {−2, −1, 0, 2}. While the frame may be initially encoded with B=160*3=480 bits (plus eleven bits for both L and $v_{min}$) without data range reduction, this frame may now be encoded with B=160*2=320 bits, the eleven bits for L' and $v_{min}$, plus an additional two bits to encode an indicator identifying the specific one of the three possible four-value data sets s corresponding to L': {−2, 0, 1, 2}, {−2, −1, 1, 2} and {−2, −1, 0, 2}. The possible overall bit-rate reduction per frame is from 491 to 333 bits.

Note that, the case for which the set of data values s may equal {−2, 0, 2}, the number of bits b' would equal to 2 and so this case may be equally well represented with s equal to {−2, 0, 1, 2} or {−2, −1, 0, 2} (which also lead to b'=2). That is, for some data value sets, the same number of bits b' may be required per sample, even though the sizes of the data value sets differ. This is due to the use of the ceiling function when calculating b and b'. In such instances, frames with differing data set sizes may use the encoding of the data value range, $v_{min}$, etc., which may reduce complexity or allow the encoding to handle a larger number of data value sets. In this example, the data value set {−2, 0, 2} may be encoded as if it were the data value set {−2, 0, 1, 2} or the data value set {−2, −1, 0, 2} but with no values of 1 or −1, respectively, encoded. Note that if the set of distinct sample values is {2, 2}, then L' is equal to 2 and each sample may be encoded with b'=⌈$\log_2$(2)⌉=1 bits and further bit rate reduction may be achieved.

Figure 4:
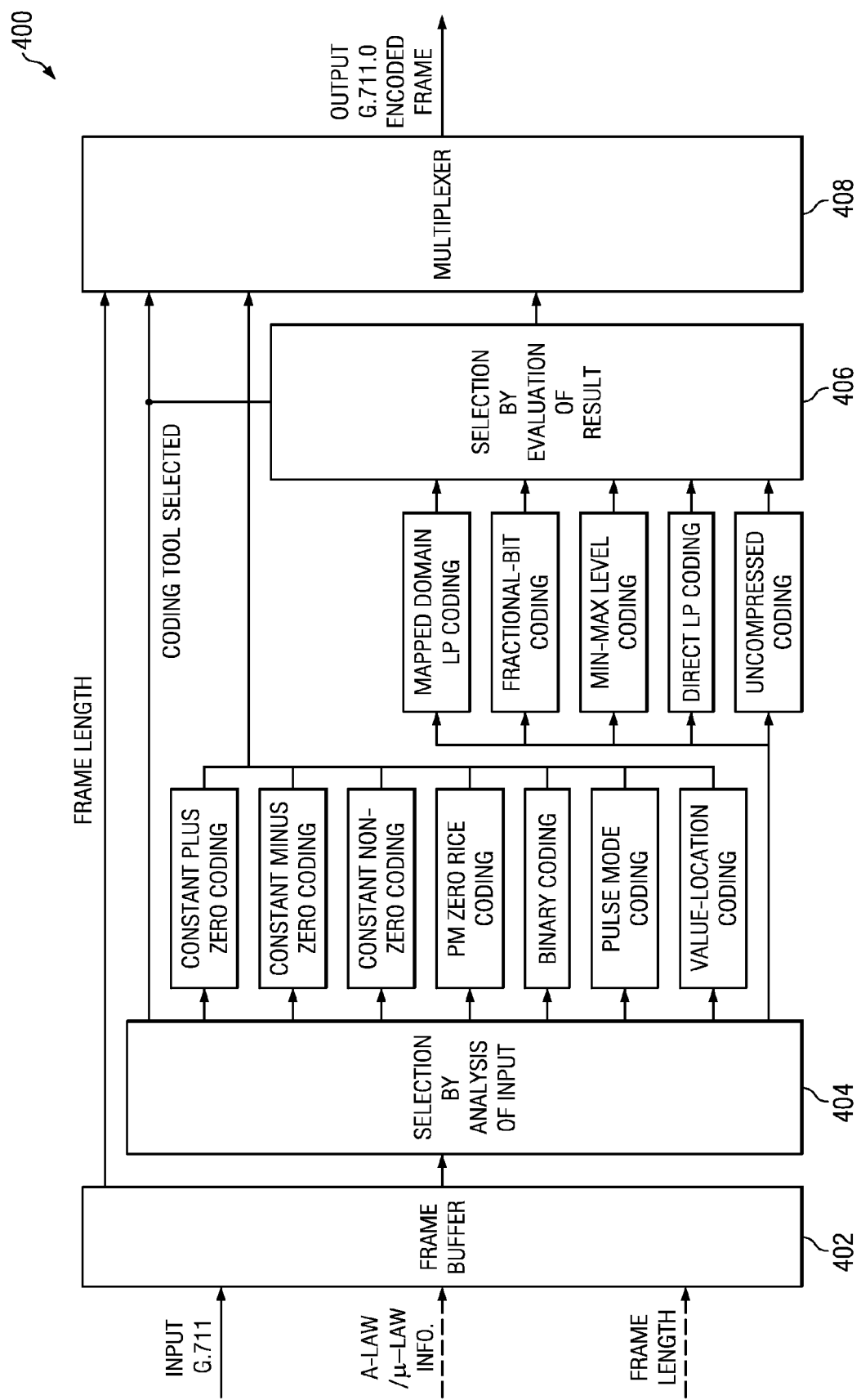
FIG. 4 shows a block diagram of an audio encoder in accordance with one or more embodiments of the invention.

FIG. 4 shows a block diagram of an audio encoder (400), e.g., the audio encoder (106) of FIG. 1, configured to perform block adaptive fractional-bit lossless encoding in accordance with one or more embodiments of the invention. More specifically, FIG. 4 shows a high level block diagram of the ITU-T G.711.0 audio encoder for illustrative purposes. The audio encoder (400) includes a frame buffer (402), two coding tool selection components (404, 406), twelve coding tools, and a multiplexer (408). The audio encoder (400) receives G.711 audio frames in the frame buffer (402). The frame size N may be 40, 80, 160, 240, or 420 samples. Each frame is then provided to selection component (404).

The input selection component (404) may select one of seven encoding tools, i.e., the three constant coding tools, the PM zero Rice coding tool, the binary coding tool, the pulse mode coding tool, and the value-location coding tool, to which it is connected for encoding the frame based on an analysis of the audio frame and/or determine that the frame should be encoded by one of the five other coding tools, i.e., the mapped domain LP coding tool, the fractional-bit coding tool, the min-max level coding tool, the direct LP coding tool, and the uncompressed coding tool. The outputs of the latter five coding tools are provided to output selection component (406) which selects the best output of the five coding tools by analyzing the results of the coding tools. The output selection component (406) may not require a complete encoding by each of the five coding tools, but rather may estimate the resulting encoded frame sizes and select one of the coding tools for performing the actual encoding based on the estimates. The multiplexer (408) selects which coding tool bit stream to output: the bit stream of the coding tool selected by the input selection component (404) or the bit stream of the coding tool selected by the output selection component (406).

The coding techniques provided by each of the coding tools are described in ITU-T G.711.0. Further, the value-location coding tool may implement a method for lossless value-location coding as described in co-pending U.S. patent application Ser. No. 12/818,165 (TI-68090). Embodiments of the value-location coding tool may implement an embodiment of adaptive encoding of a digital signal with missing values as described herein. The fractional-bit coding tool may implement a method for block adaptive fractional-bit encoding as described in co-pending U.S. patent application Ser. No. 12/818,164 (TI-67480). Embodiments of the block adaptive fractional-bit encoding method may implement an embodiment of adaptive encoding of a digital signal with missing values as described herein.

Embodiments of the methods and encoders described herein may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). Any included software may be initially stored in a computer-readable medium such as a compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 5:
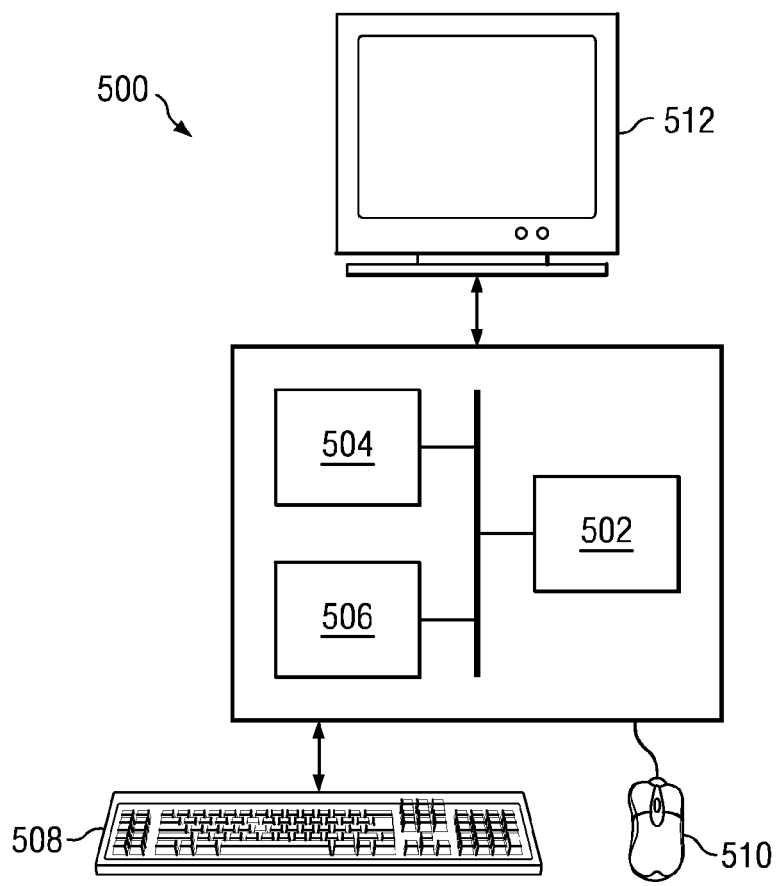
FIG. 5 shows an illustrative digital system in accordance with one or more embodiments of the invention.

Embodiments of the methods and encoders for data value range reduction as described herein may be implemented for virtually any type of digital system (e.g., a desk top computer, a laptop computer, a handheld device such as a mobile (i.e., cellular) phone, a personal digital assistant, a Voice over Internet Protocol (VoIP) communication device such as a telephone, server or personal computer, etc.) with functionality to capture or otherwise generate digital signals. FIG. 5 shows a block diagram of an illustrative digital system (500) (e.g., a personal computer) that includes a processor (502), associated memory (504), a storage device (506), and numerous other elements and functionalities typical of digital systems (not shown). In one or more embodiments of the invention, the digital system (500) may include multiple processors and/or one or more of the processors may be digital signal processors.

The digital system (500) may also include input means, such as a keyboard (508) and a mouse (510) (or other cursor control device), and output means, such as a monitor (512) (or other display device). The digital system (500) may also include an audio capture device (not shown) that includes circuitry (e.g., a microphone) for capturing audio sequences. The digital system (500) may include an audio encoder, e.g., the encoder of FIG. 3, with functionality to perform embodiments of the method of FIG. 2 as described herein. The digital system (500) may be connected to a network (not shown) (e.g., a local area network (LAN), a wide area network (WAN) such as the Internet, a cellular network, any other similar type of network and/or any combination thereof) via a network interface connection (not shown). Those skilled in the art will appreciate that the input and output means may take other forms.

Further, those skilled in the art will appreciate that one or more elements of the aforementioned digital system (500) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (500) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method of a digital signal processor for encoding samples in a digital signal, wherein the digital signal is a digital audio signal, the method comprising:
    considering every value in a plurality of samples of the digital signal; and
    lossless encoding the plurality of samples via the signal processor;
    wherein an output number of bits is adapted for coding efficiency when a value in a range of possible distinct data values of the plurality of samples is missing in the plurality of samples and reducing a number of required bits based on the distinct data values;
    encoding an indicator that identifies the particular value that is missing from the range of possible distinct data values, an indicator identifying a data value set of the plurality of samples, and data related to the value in the range; and
    transmitting, to a receiver, the encoded plurality of samples and the encoded indicator that identifies the particular value that is missing from the range of possible distinct data values, the indicator identifying a data value set of the plurality of samples, and the data related to the value in the range,
    wherein the output number of bits is adapted by one of method 1 or method 2,
    wherein method 1 includes:
        computing a possible data value range of the plurality of samples;
        computing an actual data value range of the plurality of samples by reducing the possible data value range by one for each value between a minimum sample value in the plurality of samples and a maximum sample value in the plurality of samples that is not found in the plurality of samples; and
        encoding the plurality of samples using the actual data value range, and wherein method 2 includes:
    computing a possible data value range of the plurality of samples;
    reducing the possible data value range by one when a predetermined value is not present in the plurality of samples to generate a reduced data value range; and
    encoding the plurality of samples using the reduced data value range.

2. The method of claim 1, wherein the predetermined value is −1.

3. The method of claim 1, wherein the output number of bits is adapted by:
    encoding an indicator that a value in the range of possible distinct data values is not found in the plurality of samples.

4. A digital system configured to encode samples in a digital signal, wherein the digital signal is a digital audio signal, the digital system comprising:
    means for considering every value in a frame of N samples of the digital signal; and
    means for lossless encoding the N samples via a digital signal processor, wherein an output number of bits is adapted for coding efficiency when a value in a range of possible distinct data values of the N samples is missing in the plurality of samples and reducing a number of required bits based on the distinct data values and
    means for encoding an indicator that identifies the particular value that is missing from the range of possible distinct data values, an indicator identifying a data value set of the plurality of samples, and data related to the value in the range,
    wherein the means for lossless encoding is configured to adapt the output number of bits by one of method 1 or method 2,
    wherein method 1 includes:
        computing a possible data value range of the N samples;
        computing an actual data value range of the N samples by reducing the possible data value range by one for each value between a minimum sample value in the N samples and a maximum sample value in the N samples that is not found in the N samples; and
        encoding the N samples using the actual data value range, and wherein method 2 includes:
    computing a possible data value range of the N samples;
    reducing the possible data value range by one when a predetermined value is not present in the N samples to generate a reduced data value range; and
    encoding the N samples using the reduced data value range.

5. The digital system of claim 4, wherein the predetermined value is −1.

6. The digital system of claim 4, wherein the means for encoding is configured to adapt the output number of bits by:
encoding an indicator that a value in the range of possible distinct data values is not found in the N samples.

* * * * *